N. M. LURTON.
Grain Measure.
No. 68,761.
Patented Sept. 10, 1867.
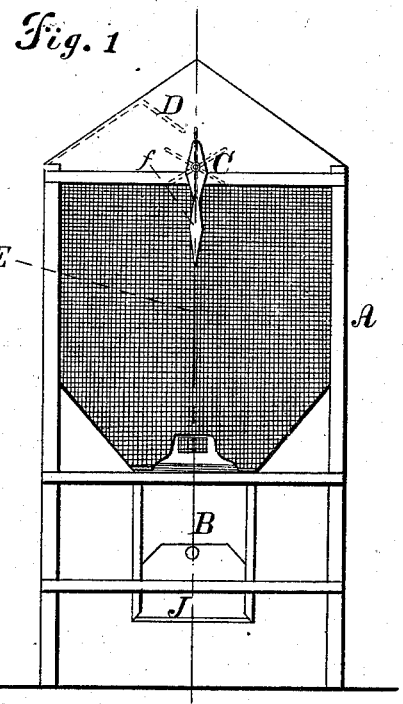
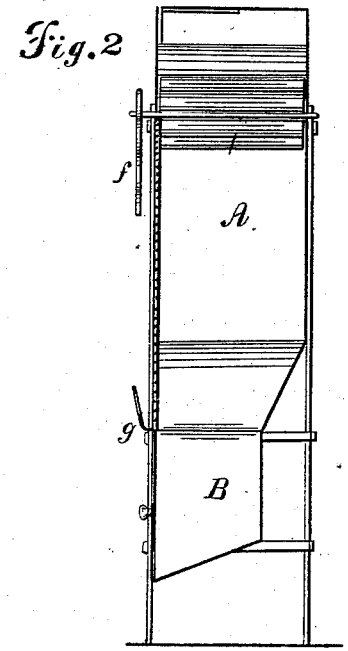

United States Patent Office.

N. M. LURTON, OF NEWBERN, ILLINOIS.

Letters Patent No. 68.761, dated September 10, 1867.

---

GRAIN-MEASURE.

---

The Schedule referred to in these Letters Patent and making part of the same.

---

TO ALL WHOM IT MAY CONCERN:

Be it known that I, N. M. LURTON, of Newbern, in the county of Jersey, and State of Illinois, have invented a new and improved Grain-Measure; and I do hereby declare that the following is a full, clear, and exact description thereof, which will enable others skilled in the art to make and use the same, reference being had to the accompanying drawings forming part of this specification.

This invention relates to a new and improved method of measuring grain as it comes from the threshing machine; and it consists in providing a box into which the grain is delivered, with a revolving wheel and indicator at the upper part, and a slide at its lower end with a measure attached, as I will proceed to describe.

Figure 1 is a front elevation, showing the whole arrangement.

Figure 2 is a side or edge elevation.

Similar letters of reference indicate like parts.

A represents the receiving-box, which may be made of any desired size and material, and holding ten bushels, more or less. B is the measuring-box, which may hold one bushel or any other desired quantity, and which is connected with the box A, as seen in the drawing. In the upper part of the receiving-box there is a winged wheel, C, upon which the current of grain strikes as it is delivered from the threshing machine over the apron D, and the wheel C is revolved thereby. This wheel will revolve until the box is nearly filled, and the revolution of the wheel will be indicated by the pointer $f$. When that stops, it is notice that the box is full, or nearly so. In the bottom of this box there is a slide, $g$, which rests upon cross-pieces, seen at $h$. This slide is a metallic plate, which can be readily forced through the grain, (after being withdrawn for the purpose of filling the measuring-box below,) and thereby cut off the desired quantity. J is a slide for the measuring-box. When the box B has been filled and the slide $g$ forced in, and the grain thereby confined above, the grain in the measuring-box is discharged into a bag or any other receptacle. E represents a screen of wire cloth or perforated metal, placed on and forming one side of the receiving-box A, for the purpose of allowing the quantity of grain in the box or hopper A to be seen.

What I claim as new, and desire to secure by Letters Patent, is—

1. The receiving-box or hopper A and the measuring-box B, arranged substantially as described, in combination with the revolving wheel C, the pointer $f$, and the screen E, when used for the purposes specified.

2. I claim the indicating-wheel C and pointer $f$, as and for the purposes described, in combination with the boxes A and B.

N. M. LURTON.

Witnesses:
JOHN C. LURTON,
D. D. RAINEY.